E. P. KENDALL.
POTATO HARVESTER.
APPLICATION FILED JUNE 26, 1916.
1,314,270.
Patented Aug. 26, 1919.
3 SHEETS—SHEET 2.
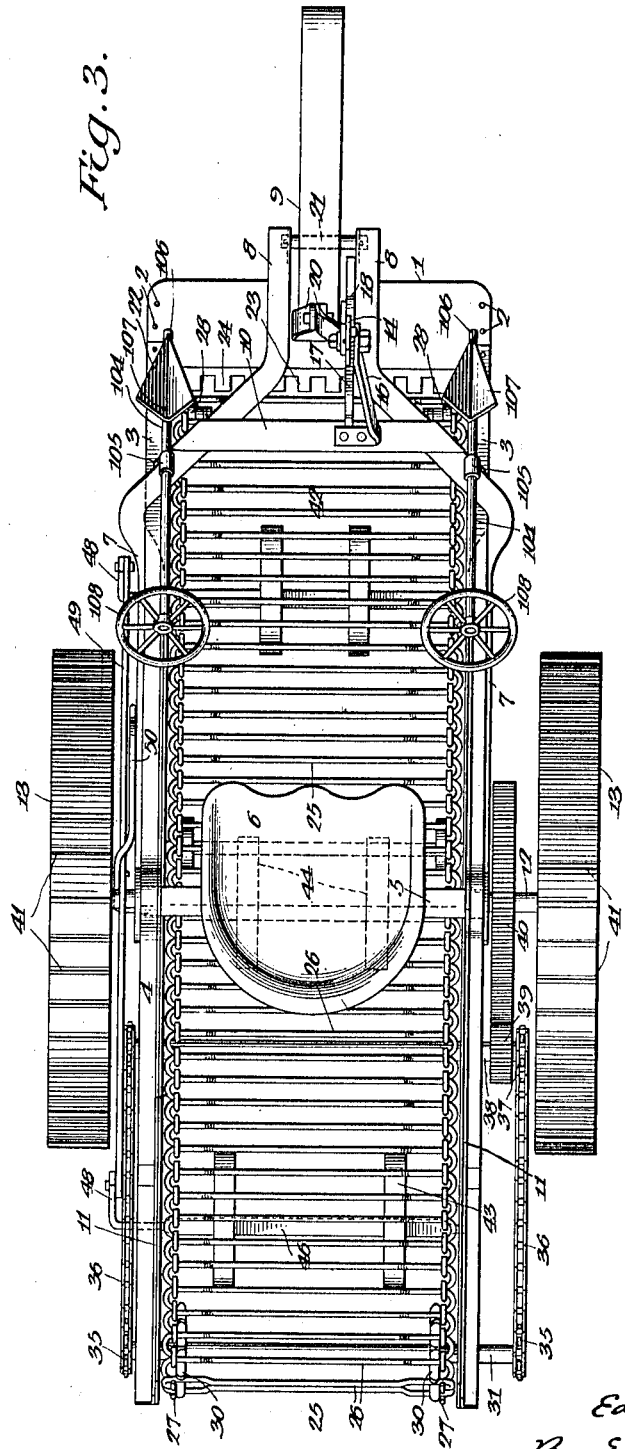
Inventor:
Edward P. Kendall
By Edward R. Alexander
Attorney

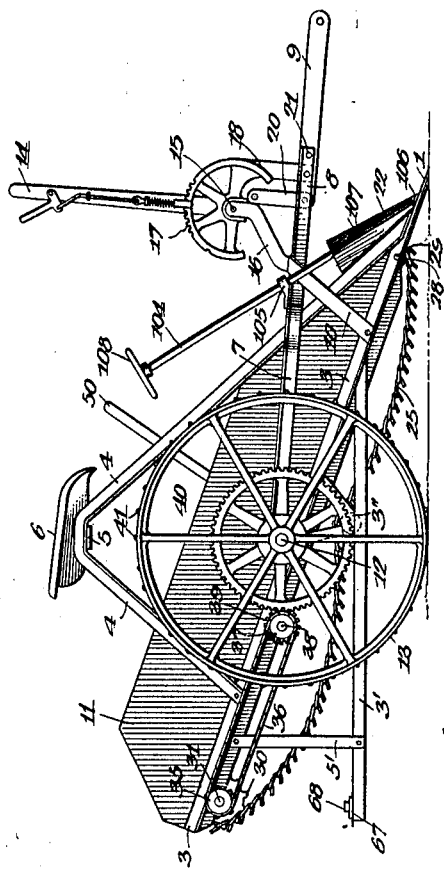

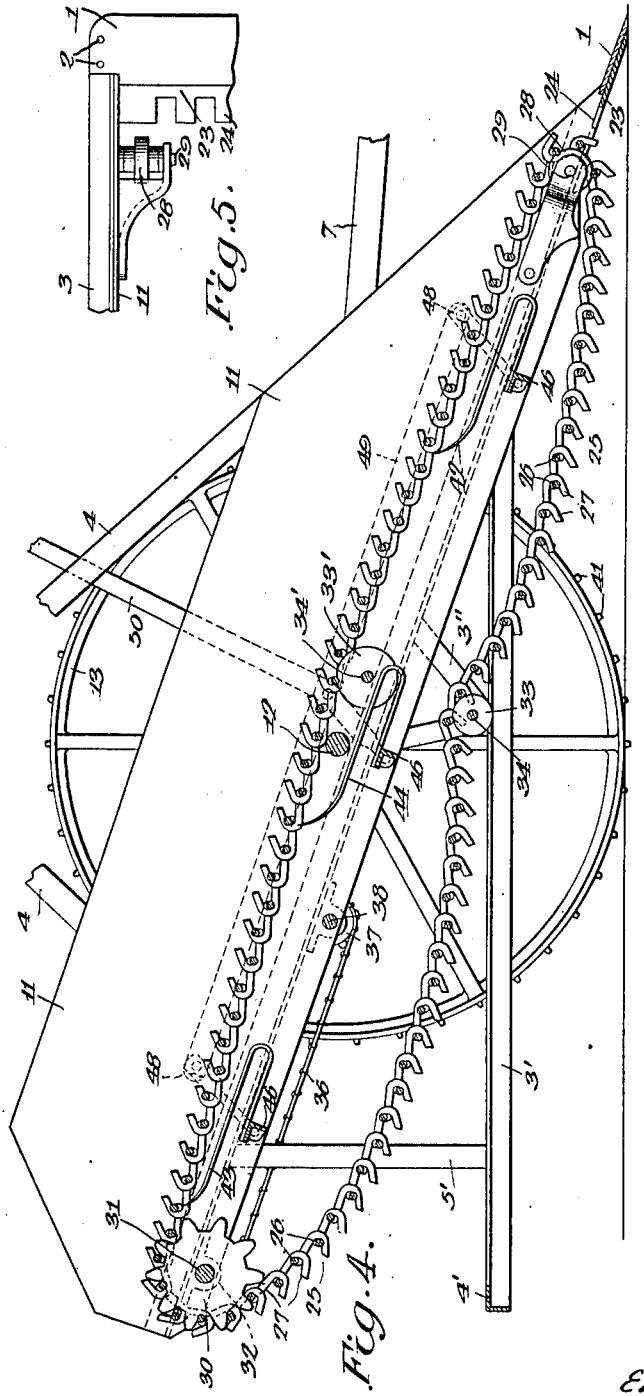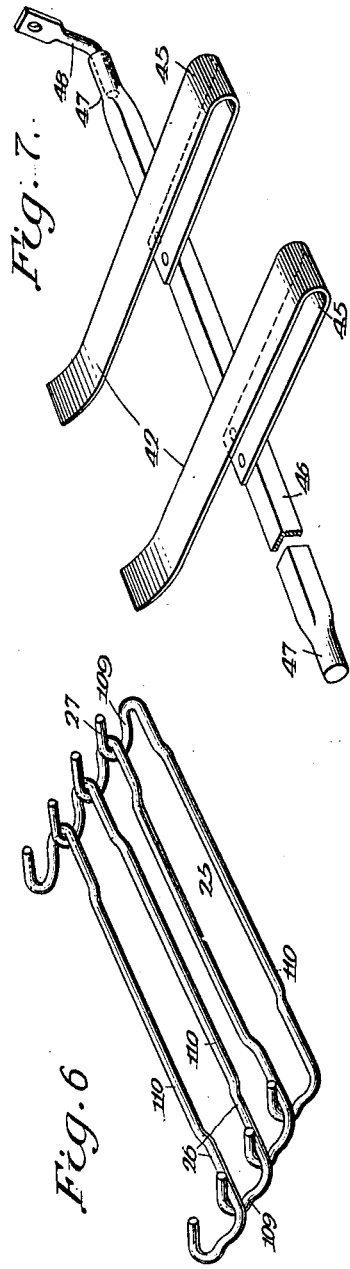

UNITED STATES PATENT OFFICE.

EDWARD P. KENDALL, OF BOWDOINHAM, MAINE.

POTATO-HARVESTER.

1,314,270.

Specification of Letters Patent.

Patented Aug. 26, 1919.

Original application filed September 27, 1912, Serial No. 722,722. Divided and this application filed June 26, 1916. Serial No. 105,950.

*To all whom it may concern:*

Be it known that I, EDWARD P. KENDALL, a citizen of the United States, residing at Bowdoinham, in the county of Sagadahoc and State of Maine, have invented certain new and useful Improvements in and Relating to Potato-Harvesters, of which the following is a specification.

This invention relates to apparatus for digging potatoes and has for its object the provision of apparatus comprising means for digging or scooping up the potatoes and other neighboring materials, such as soil, vines, turfs and stones, together with an improved agitating and screening conveyer arranged to receive the potatoes and other materials from the first named means, and effecting the detachment of the potatoes from the vines and a partial separation of the remaining materials from the potatoes.

This application is a division of my co-pending application Serial No. 722,722, filed September 27, 1912, for potato harvester, on which application has since issued Patent Number 1,199,704, dated September 26, 1916. While the mechanism herein set forth was designed as a part of my improved potato harvester disclosed in my said parent case, and while it is peculiarly useful in that connection, it is to be understood that its use is not limited to association with the particular supplementary separating mechanism shown in the parent case and, indeed, that it can be used independently for the purpose of digging potatoes and delivering them, detached from the vines, upon the ground. In my parent case the plate 1 which scoops up the potatoes and other materials from the ground is appropriately termed the digger inasmuch as the screening conveyer herein shown constitutes a part of the mechanism which, in the complete harvester of the parent case, effects the complete separation of the potatoes from the other materials; but in the present case, for the sake of simplicity, I will refer to the entire mechanism herein shown as a potato digger.

In order to make the invention more clearly understood I have shown in the accompanying drawings means for carrying the same into practical effect, without limiting my improvements, in their useful applications, to the particular constructions which, for the sake of example, I have illustrated.

In said drawings:

Figure 1 is a side elevation of a potato digger, embodying my invention, the same being shown viewed from the offside of the machine.

Fig. 2 is a side view, partly in section, on a larger scale, looking from the near side of the machine, showing the digger or scoop, the screening conveyer and some of their related parts.

Fig. 3 is a plan view of the digger or scoop, and the screening conveyer.

Fig. 4 is a longitudinal vertical section, viewed from the off-side of the machine, showing the digger or scoop, the screening conveyer, and related parts.

Fig. 5 is a plan view of a portion of the forward part of the same.

Fig. 6 is a perspective view of a portion of the screening conveyer.

Fig. 7 is a perspective view of one pair of the springs employed to give vertical movement to parts of the screening conveyer showing also the pivotal support of the said springs.

Referring to the drawings, 1 is a digging appliance or blade adapted to enter the earth to a point below the potatoes and to be propelled horizontally, as by horse power, to scoop up the potatoes with the neighboring earth and vines, and such pebbles and stones as may be present. The digger 1 is secured, as by rivets to the front lower end of angle irons 3 which extend upwardly and rearwardly and form a part of the frame of the machine. The digger 1 is substantially of uniform width, its forward corners only being slightly rounded. This digger or knife 1 is adapted to enter the earth beneath a hill of potatoes and scoop up and direct the potatoes and material in its path rearwardly with little or no tendency to crowd out the potatoes and dirt from the sides of the knife or blade. In practice I have been using a knife about four and one half inches wide. 4 indicates bracing and seat supporting angle irons riveted to the irons 3 and arching upward to the proper height. At the top they are united by a cross bar 5 on which is fixed the driver's seat 6. 7 indicates substantially horizontal frame bars attached at their rear ends to the frame angle irons 3 and extending forward and inward, their front ends 8 forming a means for the adjustable connection of the draft tongue 9. The latter may be short and adapted for the attachment at its front end of the doubletree of a team of horses. 10 indicates a brace bar which is attached at its ends to the frame parts 3, passing up and over the frame bars 7. 11, 11 are side boards fixed on the bars 3. 3' indicates horizontal frame bars attached at their front ends to the bars 3, connected by a rear cross bar 4' and united near their rear ends with the bars 3 by vertical braces 5'.

This frame is supported on a cross-axle 12 carried by ground wheels 13 fixed on said axle, and the frame may tilt on the axle for the depression of the digger knife to the desired depth, or to lift the digger knife to the surface of or clear of the ground. Such tilting of the frame may be effected by raising or lowering the tongue 9 to raise or lower the point of draft. This is effected by a hand lever 14 operating on a pivot 15. The latter has bearings in a bracket 16 fixed on the brace 10. 17 is a toothed segment for locking the lever in a well known manner after it has been adjusted. The segment is mounted on the pivot 15 and is fixed to the frame by an arm 18 which is attached to one of the bars 7. The short arm 19 of the lever is connected by link 20 to the rear end of the tongue 9, which is pivoted at 21 between the bars 7. The lifting of the said links by the hand lever causes the front end of the tongue and the point of draft to be lowered and the digger knife 1 raised, and a reverse operation of the parts causes the digger knife to be depressed to the desired depth. 22 is a rotary metal guard, one at each side of the lower end of the digger frame. Each guard comprises a shaft 104 mounted in bearings 105, 106 on the digger frame, on which shaft are fixed wings 107 and a hand wheel 108. By the latter the guard may be turned on its axis to throw off, to the ground, any large stone, or any collection of stones or vines which may become lodged against the guard.

23 is a sheet iron plate attached to the rear of the digger knife or blade 1 and having rearwardly extending tongues 24. These tongues and the spaces between them are or may be about one inch wide. The potatoes, earth, etc., pass from the digger knife 1 at once over this plate and, while the potatoes will not pass through the said spaces, a considerable quantity of the earth and pebbles is at once got rid of before they reach the screening or sifting conveyer. The latter is shown at 25. It consists of a series of transverse rods 26 mounted at their ends in or on endless chains 27, or formed at their ends and linked together so as to form in effect two such endless chains (Fig. 6), and spaced apart so as to allow earth and pebbles to sift between them to the ground below but to retain and convey the potatoes. When constructed so that parts of the rods 27 form the chains, the ends of the bars are bent into S-shaped links 109 integral with the rods, which links are hooked into each other as shown. The body of each rod between its ends may be bent out of its axial line, or offset, as shown at 110, (Fig. 6), to better engage the material to be elevated. At their forward lower ends the chains 27 are mounted on flanged pulleys 28, the journals of which are studs 29 fixed on the digger frame. The upper ends of the chains are mounted on driving sprocket wheels 30 fixed on a shaft 31 mounted in suitable bearings 32 on or under the digger frame. The lower limb or run of the conveyer 25 has some slack which is held up by wheels 33 on a cross shaft 34 carried by brackets 3'' attached to the side members 11, 11. Also I support the upper limb or run of the conveyer 25 by wheels 33' loose on a shaft 34' mounted in the frame bars 3. 35 indicates sprockets on the ends of the shaft 31 and driven by chains 36 from sprockets 37 on a counter shaft 38. The latter has fixed on it a pinion 39 engaged and driven by a gear wheel 40 on the ground wheel axle 12. The arrangement of the gearing and driving connections is such that the forward motion of the digger and rotation of the ground wheels will drive the upper limb or run of the conveyer 25 rearwardly. The wheels 13 may be provided with ground-engaging projections 41 to prevent slippage and insure an efficient driving of the conveyer.

42, 43, 44 indicate agitating springs arranged beneath the upper limb of the conveyer 25 so that the conveyer rods 26 receive a vibratory impulse as they ride over the free ends of the springs and snap off from the same, and each succeeding rod receives a blow from the springs as they are released by a preceding rod. These springs are so arranged relative to the upper run of the conveyer 25 that their free ends are successively engaged by the conveyer rods 26 as the rods traverse upwardly and rearwardly during the operation of the digger mechanism. This movement of any rod in engagement with the upper free end of any spring tends to depress the free end of the spring and place it under tension in accordance with the amount of such depression or deflection, so that when the conveyer rod in question snaps off the end of the spring, that end of the spring delivers a severe blow to the succeeding conveyer rod in the series, thereby agitating or violently shaking the material on that part of the conveyer and tending to break up the clods of earth and to cause the same to be screened rapidly through the conveyer and at the same time to separate potatoes from the vines. The agitating springs are preferably arranged in pairs, and so as to act on different parts of the rods at different points along the upper run of the conveyer. Thus, the pair of springs 42, at the lower part of the conveyer, act beneath the middle parts of the conveyer rods, the pair of springs 43 at the upper part of the conveyer act near the outer ends of the rods, and the intermediate pair of springs 44 act on the rods between their middles and their outer ends. All parts of each rod are thus thoroughly agitated in a peculiar manner by sharp movements and blows to shake the potatoes from the vines and separate foreign matter from the potatoes and cause it to sift down between the rods, and to cause the vines to ride on the top of the conveyed material ready for their subsequent separation and removal. The springs are formed with lower return bends 45 which are secured, as by riveting, to transverse angle irons 46 the ends of which are shaped as or provided with journals 47 mounted in bearings in or on the side members 11, 11. At one side of the machine the irons 46 have attached to them crank arms 48 connected with a pitman or link 49 by the longitudinal movement of which the cranks are turned to tilt the irons 46 and the agitating springs, thus causing the springs to bear with the desired degree of pressure at their free ends against the under sides of the rods 26. 50 is a hand lever which is formed with or is attached to one of the crank arms 48, by which lever the pitman 49 can be moved to operate and adjust all of the springs as above described.

At its rear end the conveyer 25 discharges the potatoes, vines and any other materials which have not been separated by the screening apparatus, and these discharged materials may, if it be desired, be received by other suitable devices for effecting a further separation, as, for example, separating mechanism disclosed in the above mentioned parent case, or the potatoes and other materials may be discharged from the conveyer 25 directly to the ground.

In operation, the digger knife 1 is directed to enter the ground and scoop up the potatoes which are grown in rows. I have invented a knife which in actual practice tends to deliver the potatoes, earth, etc., quickly and directly to the screening conveyer with little or no tendency to deflect any of the material or potatoes toward the sides of the machine in such manner that they will be thrown aside from the screening conveyer, as is the common tendency of all pointed blades or knives with which I am familiar. As soon as the potatoes and other material reach the screening conveyer, they are subjected to violent agitation in accordance with the adjustment of the agitating springs. I have found in actual practice that with the use of my agitating springs two horses will be able to do the work where four were necessary in the absence of such springs. This may be attributed to the fact that the screening action of the screening conveyer is a rapid and efficient one. The same amount of dirt, pebbles, small stones, etc., is not carried up on my screening conveyer as has been my experience with all screening conveyers not provided with my agitating springs. The greater the load or weight of material on the screening conveyer the more the power necessary to elevate such load or propel the screening conveyer, and as this power is derived from the ground and driving wheels of the digging apparatus, the traction of the wheels must be sufficient, otherwise they will slip along the ground instead of working. With my improved agitating springs I am enabled to dispense with the ordinary traction cleats or spurs on the ground and drive wheels and still use fewer horses or less power for propelling the digger.

In addition to the above, the agitating springs facilitate and assist in the separation of the potatoes themselves from the vines, the vibration imparted being sufficient to effect such separation to a highly satisfactory degree.

When the potatoes, vines and any other materials that have not been separated by the screening operation reach the upper end of the conveyer 25, they are discharged therefrom, to be received by additional separating mechanism if desired, or to pass directly to the ground.

To those skilled in the art of making apparatus of the class described differing embodiments and applications of my invention will suggest themselves. My disclosures and the description herein are purely illustrative, and are not intended to be in any sense limiting.

I claim—

1. In a potato harvester, the combination of a conveying mechanism arranged to receive dug potatoes and their associated materials and comprising a series of transverse rods, a U-shaped spring having its free end disposed in the path of movement of said rods and arranged to be deflected and released by each of said rods, whereby said spring strikes each succeeding rod a blow to agitate the conveying mechanism, and means for moving said conveying mechanism relatively to said spring.

2. In a potato harvester, the combination of a conveying mechanism arranged to receive dug potatoes and their associated materials and comprising a series of transverse rods, a series of springs having their free ends disposed in the path of movement of said rods and each arranged to be deflected and released by each rod as the conveying mechanism moves rearwardly, whereby each spring strikes the succeeding rods blows successively to agitate the conveying mechanism, the said springs being arranged to operate on different portions of each rod, and means for moving said conveying mechanism relatively to said springs.

3. In a potato harvester, the combination of a conveying mechanism arranged to receive dug potatoes and their associated materials and comprising a series of transverse rods, a series of springs having their free ends disposed in the path of movement of said rods and each arranged to be deflected and released by each rod as the conveying mechanism moves rearwardly, whereby each spring strikes the succeeding rods blows successively to agitate the conveying mechanism, the said springs being arranged to operate on different portions of each rod and spaced from each other longitudinally of the conveying mechanism, and means for moving said conveying mechanism relatively to said springs.

4. In a potato harvester, the combination of a screening conveyer arranged to receive dug potatoes and their associated materials, upwardly turned springs arranged beneath the conveyer to strike and cause the agitation of the same, transverse rockable bars carrying the said springs, crank arms connected with the said bars, and a connection between said crank arms and said bars to adjust the springs relatively to the conveyer.

In testimony whereof I affix my signature in the presence of two witnesses.

EDWARD P. KENDALL.

Witnesses:
CHARLES S. CROOKER,
ALTON C. SMALL.

Copies of this patent may be obtained for five cents each, by addressing the "Commissioner of Patents, Washington, D. C."